Sept. 29, 1953 W. E. HANCOCK 2,653,409
SPINNER FISHING LURE
Filed Oct. 5, 1951

Inventor:
William E. Hancock.
By Harold J LeVesconte
Atty.

Patented Sept. 29, 1953

2,653,409

UNITED STATES PATENT OFFICE 2,653,409

SPINNER FISHING LURE

William E. Hancock, Sherman Oaks, Calif.

Application October 5, 1951, Serial No. 249,905

1 Claim. (Cl. 43—42.51)

This invention relates to fishing lures and particularly to an improved form thereof adapted to spin as it is dragged through the water or as it is held in a relatively constant position in a current to be caused to be spun by the current.

The principal object of the invention is to provide a spinning type of fishing lure which is short and which tapers somewhat from the front to the rear end thereof so that upon striking, the mouth of the fish will tend to close during relative forward movement of the lure with resultant greater assurance that the fish will be hooked.

Another object of the invention is to provide a lure of the above character in which the spinning element and hook rotate together with resultant simulation of a fish; the blur caused by the rotating hook simulating a fish tail.

A further object of the invention is to provide a spinner element for a fishing lure which is simple in design and economical to manufacture.

With the above objects in view, together with such other objects and advantages as may subsequently appear, the invention resides in the parts, and in the construction, combination and arrangement of parts disclosed, by way of example, in the following specification of one mode of execution of the invention; reference being had to the accompanying drawings which form a part of said specification and in which drawings.

Figure 1:
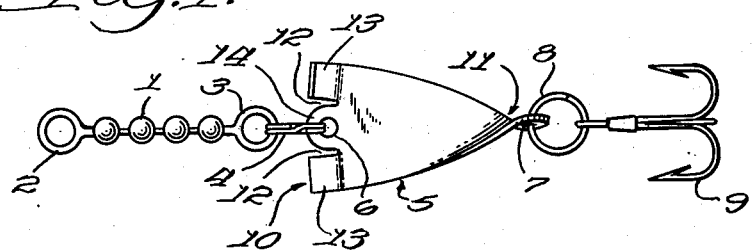
Fig. 1 is a side elevation of a lure embodying the invention.

The illustrated embodiment of the invention comprises a swivel leader component 1, preferably of the ball chain type, although other well known forms of swivels may be used; said component having a ring 2 at the forward end thereof for attachment to a line or leader, and having a second ring 3 at the rear end thereof which is connected by a split ring 4 to the forward end of the spinner component 5 by engagement with a hole 6 in the forward end of the spinner component disposed in substantial alignment with the axis of rotation of the spinner component. The rear end of the spinner component is provided with a hole 7 also disposed in substantial alignment with said axis of rotation and a second split ring 8 in said hole connects the rear end of the spinner component with the eye of a hook 9; the hook preferably being of the treble point type.

Figure 2:
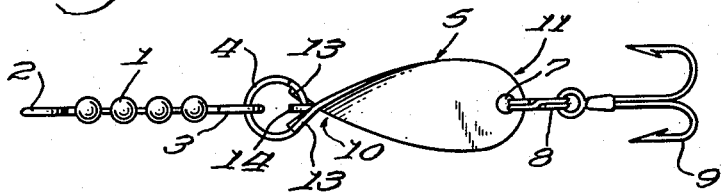
Fig. 2 is a bottom plan view of the lure when in the position shown in Fig. 1.
Figure 3:
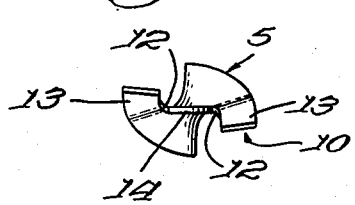
Figs. 3 and 4 are front and rear end elevations, respectively, of the spinner element of the lure, and, Fig. 5 is a flat development of the sheet metal blank from which the spinner element is formed.
Figure 4:
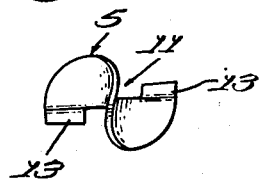
Figure 5:
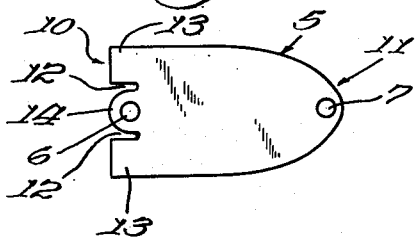

The spinner component 5 is formed of a blank of sheet metal having a length of about double the width thereof; the forward end 10 being disposed at right angles to the length of the blank and the rear end thereof being of modified semi-elliptical outline in plan as best shown at 11 in Fig. 5. The forward end 10 of the spinner component is provided with a pair of longitudinally extending cuts 12, 12 which divide the forward end into a pair of outer wing portions 13, 13 and a center portion 14 in which the hole 6 is located; the outer end of the center portion 14 being rounded radially parallel to the hole 6 to permit free swinging movement of the ring 4 relative to the spinner component. Between its ends, the spinner component is twisted into a helix of approximately a quarter turn concentrically disposed about a line intersecting the holes 6 and 7, and the wing portions 13, 13 are bent to form continuations of said helix as best shown in Figs. 2, 3 and 4.

While the foregoing description of the spinner component has been accompanied by terms indicating how it may be fashioned by hand, it will be understood that it may be otherwise formed incident to mass production involving stamping and forming operations with retention of the above-described configuration. The side surfaces of the spinner component are polished and may be given any suitable finish.

When the lure is dragged through the water, the spinner component will be caused to rotate and will rotate the hook with it; the appearance of the rotating lure simulating a fish. Since the swivel component is attached to the spinner component at a point within the forward end of the spinner component, the lure is sufficiently short to permit the entire lure being taken by a striking fish. Further, since the spinner component is somewhat tapered toward the rear end thereof, it will be more easily pulled away from a striking fish incident to setting the hook and the hook will be more surely set into the fish.

While in the foregoing specification there has been disclosed one embodiment of the invention, it is appreciated that modifications will suggest themselves to those skilled in the art and, therefore, the invention shall be deemed to include all such modifications in the parts, and in the construction, combination and arrangement of parts as shall come within the purview of the appended claim.

I claim:

A spinner fishing lure initially of sheet material of blank form having straight side edges and a curved rear edge connecting said side edges, a front edge having portions adjacent the side edge at right angles thereto, a central portion of semi-circular form and slots between the central portion and the first mentioned front edge portions, said front edge portions having substantial extent, said blank in final form having the central portion of the curved rear edge flat and in a plane at right angles to the semi-circular central portion of the front edge, said semi-circular portion being flat, the portions of the front edge, adjacent the side edge extending in opposite directions from the plane of the central rear portion at an acute angle thereto, and a portion of the blank between the flat ends thereof having a twist, said flattened portions having openings therein for the attachment of fishing implements.

WILLIAM E. HANCOCK.

References Cited in the file of this patent

UNITED STATES PATENTS

| Number | Name | Date |
|---|---|---|
| 261,194 | Wylly | July 18, 1882 |
| 967,660 | Pedersen | Aug. 16, 1910 |
| 1,123,717 | Fey | Jan. 5, 1915 |
| 1,566,059 | Willson | Dec. 15, 1925 |
| 2,002,117 | Lavitt | May 21, 1935 |
| 2,167,335 | Hayes | July 25, 1939 |

FOREIGN PATENTS

| Number | Country | Date |
|---|---|---|
| 152,796 | Switzerland | May 2, 1952 |